United States Patent [19]

Masumoto et al.

[11] Patent Number: 5,187,218
[45] Date of Patent: Feb. 16, 1993

[54] ACETAL RESIN COMPOSITION CONTAINING A TERMINAL-ETHERIFIED POLYALKYLENE GLYCOL

[75] Inventors: Isamu Masumoto; Zenpei Mizutani; Hiroshi Yada; Yoshihito Hara, all of Yokkaichi, Japan

[73] Assignee: Mitsubishi Gas Chemical Company, Inc., Tokyo, Japan

[21] Appl. No.: 740,617

[22] Filed: Aug. 5, 1991

[30] Foreign Application Priority Data

Aug. 21, 1990 [JP] Japan .................. 2-218182

[51] Int. Cl.$^5$ .................. C08J 5/16; C08K 5/10; C08L 75/10
[52] U.S. Cl. .................. 524/317; 524/306; 524/310; 524/311
[58] Field of Search .............. 524/284, 306, 311, 593, 524/310, 317

[56] References Cited

U.S. PATENT DOCUMENTS 4,900,769 2/1990 Kimura et al. .................. 524/312

Primary Examiner—Paul R. Michl
Assistant Examiner—U. K. Rajguru
Attorney, Agent, or Firm—Wenderoth, Lind & Ponack

[57] ABSTRACT

An acetal resin composition comprising:
(A) 100 parts by weight of an acetal resin,
(B) 0.01 to 5 parts by weight of a terminal-etherified polyalkylene glycol of the formula (I)

$$R^1-O-(-R^2-O-)_m-R^3$$

wherein $R^1$ is a hydrogen atom, an aliphatic hydrocarbon group having 1 to 7 carbon atoms, an aryl group or an aralkyl group, $R^2$ is an alkylene group having 2 to 3 carbon atoms, $R^3$ is an aliphatic hydrocarbon group having 1 to 7 carbon atoms, an aryl group or an aralkyl group, and m is a number of at least 20, and
(C) 0.01 to 2 parts by weight of an ester from a polyhydric alcohol having 2 to 10 carbon atoms and a higher fatty acid having 22 to 32 carbon atoms. This acetal resin composition has highly improved mold releasability when injection-molded without any substantial impairment of mechanicla properties and thermal stability inherent to an acetal resin and gives precision molded articles having little molding strain.

5 Claims, 2 Drawing Sheets

FIG. 1-1
FIG. 1-2
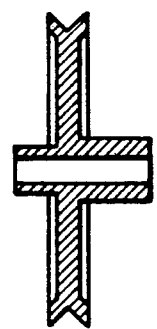
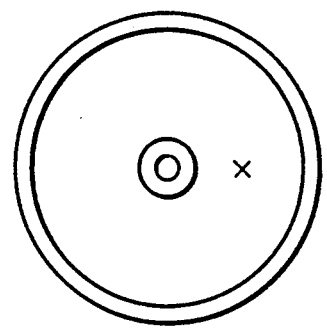
FIG. 2
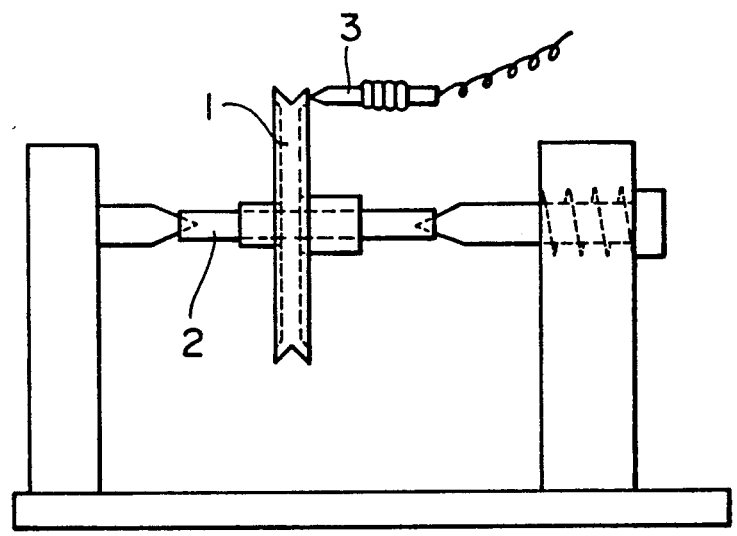

ACETAL RESIN COMPOSITION CONTAINING A TERMINAL-ETHERIFIED POLYALKYLENE GLYCOL

DETAILED DESCRIPTION OF THE INVENTION

The present invention relates to an acetal resin composition. More specifically, it relates to an acetal resin composition which has highly improved mold releasability in injection molding without any impairment of mechanical properties, thermal stability inherent to an acetal resin and with retention of appearance of molded articles therefrom and which gives precision molded articles having very little strain.

Having excellent fluidity in addition to well-balanced mechanical properties, excellent abrasion resistance and excellent thermal stability, an acetal resin is often injection-molded into machinery parts and precision instrument parts that have a complicated structure.

In such molded articles having a complicated form, a projected portion of such an article is required to be released from a mold as smoothly as possible. That is because a strong force with which such an article is to be released from a mold sometimes fracture the projected portion, or even if the article is not fractured, a molding strain is retained within the molded article and produces a bad effect during the use for a long period of time. It is therefore extremely desired to improve the mold releasability of an acetal resin.

An acetal resin has a relatively high crystallization rate and tends to attain a relatively high degree of crystallinity. Further, an acetal resin is more likely to have a molding strain than any other general amorphous resin. For these reasons, in precision molded articles obtained by injection molding such as a pulley, a gear, etc., such properties of an acetal resin not only produce a distortion such as a twist, a warpage, etc., which causes irregular rotation, a noise, etc, in practical use, but also cause a molded article fracture during the use for a long period of time.

Japanese Laid-Open Patent Publication No. 295661/1988 discloses an acetal resin composition containing an ester made from a polyhydric alcohol having 2 to 10 carbon atoms and a higher fatty acid having 22 to 32 carbon atoms or a combination of this ester with a linear higher fatty acid amide having at least 10 carbon atoms. It is the present inventors who have proposed the above acetal resin composition, in which the acetal resin has been highly improved in mold releasability when injection-molded. This acetal resin composition is imparted with sufficient mold releasabilty. However, the effect on reduction of molding strain in a molded article has not yet been satisfactory in practical use.

In order to reduce the molding strain of an injection-molded article, there have been proposed methods of decreasing the molecular weight of an acetal resin for the purpose of improving the fluidity.

Japanese Patent Publication No. 8815/1962 discloses a polyoxymethylene composition having a low apparent melt viscosity, and being formed of a polyoxymethylene which is stabilized in the terminal group and has a high polymerization degree and a saturated aliphatic alcohol having 12 to 30 carbon atoms.

Japanese Patent Publication No. 8816/1962 discloses a polyoxymethylene composition similarly having a low apparent melt viscosity, and being formed of a polyoxymethylene which is stabilized in the terminal group and has a high polymerization degree and a polyalkylene glycol.

Japanese Patent Publication No. 16174/1962 discloses an extruding or molding composition formed of a high-molecular-weight polyoxymethylene resin and a small amount of glycerin.

In compositions obtained according to the above conventional methods, however, the most important properties inherent to an acetal resin such as excellent mechanical properties, thermal stability, etc., are unavoidably impaired to some extent. Further, effect is hardly observed with regard to the mold releasability. Further, it is found that the above methods have little effect on decreasing a distortion such as a twist, a warpage, etc. in precision molded articles such as a pulley, etc.

Japanese Laid-Open Patent Publication No. 128740/1982 discloses an acetal resin composition being said to have little molding strain, which is formed of an acetal resin and both/either polyalkylene glycol alkyl ether and/or polyglycerin fatty acid ester.

However, the above acetal resin composition shows little effect on improvement in mold releasability and further, it shows little effects on practical improvement of molded articles having a complicated structure such as a pulley, a gear, etc., in the decreasing of the strain and distortion.

It is therefore an object of the present invention to provide a novel polyacetal resin composition.

It is another object of the present invention to provide an acetal resin composition which has highly improved mold releasability when injection-molded without any substantial impairment of mechanical properties and thermal stability inherent to an acetal resin and which gives precision molded articles having little molding strain.

The above objects and advantages of the present invention will be apparent from the following description.

The above objects and advantages of the present invention are achieved by an acetal resin composition comprising:
(A) 100 parts by weight of an acetal resin,
(B) 0.01 to 5 parts by weight of a terminal-etherified polyalkylene glycol of the formula (I)

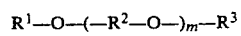

$$R^1-O-(-R^2-O-)_m-R^3$$

wherein $R^1$ is a hydrogen atom, an aliphatic hydrocarbon group having 1 to 7 carbon atoms, an aryl group or an aralkyl group, $R^2$ is an alkylene group having 2 to 3 carbon atoms, $R^3$ is an aliphatic hydrocarbon group having 1 to 7 carbon atoms, an aryl group or an aralkyl group, and m is a number of at least 20,
and
(C) 0.01 to 2 parts by weight of an ester from a polyhydric alcohol having 2 to 10 carbon atoms and a higher fatty acid having 22 to 32 carbon atoms.

FIG. 1-1 is a schematic sectional view of a molded article test piece (1) for the measurement of a distortion, which was obtained by molding an acetal resin composition of the present invention.

FIG. 1-2 is a schematic plan view of the above molded article test piece (1). In FIG. 1-2, the mark "x" indicates a position of a pin gate having a diameter of 0.6 mm.

FIG. 2 is a schematic view of an apparatus for the measurement of a distortion such as a twist, a warpage, etc. of the above molded article test piece (1).

FIG. 3-1 is a schematic sectional view of a molded article test piece (2) for the measurement of distortion such as a twist, a warpage, etc., which was obtained by molding another acetal resin composition of the present invention.

FIG. 3-2 is a schematic plan view of the above molded article test piece (2). In FIG. 3-2, the mark "x" indicates a position of a pin gate having a diameter of 0.5 mm.

Figures 1, 3:
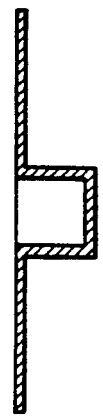

The acetal resin (A) used in the present invention includes an oxymethylene homopolymer composed substantially of oxymethylene units, which is produced from a cyclic oligomer of formaldehyde, its trimer (trioxane) or a tetramer (tetraoxane) as a starting material; and an oxymethylene copolymer preferably containing 0.1 to 20% by weight of oxyalkylene units having 2 to 8 carbon atoms, which is produced from the above cyclic oligomer and a cyclic ether such as ethylene oxide, propylene oxide, epichlorohydrin, 1,3-dioxolan, 1,3-dioxepane, formal of glycol or formal of diglycol.

The acetal resin for use in the present invention may be subjected to a thermal stabilization treatment according to a known method before use. For example, the oxymethylene homopolymer may be acylated on the terminal OH group with a carboxylic acid anhydride (e.g. according to the method disclosed in Japanese Patent Publication No. 6099/1958).

The oxymethylene copolymer may be stabilized either by a method (e.g. disclosed in Japanese Patent Publication No. 8071/1964) in which a copolymer or a copolymer composition is subjected to a heat-melting treatment to remove off the volatile components, or by a method (e.g. disclosed in Japanese Patent Publication No. 10435/1965) in which a copolymer is hydrolyzed.

The terminal-etherified polyalkylene glycol (B) used in the present invention has the formula (1) described above.

In the formula (1), $R^1$ is a hydrogen atom, an aliphatic hydrocarbon group having 1 to 7 carbon atoms, an aryl group or an aralkyl group.

The aliphatic hydrocarbon group is selected, for example, from an alkyl group and an alkenyl group, which may be linear, branched or cyclic. Specific examples of the aliphatic hydrocarbon group are alkyl groups such as methyl, ethyl, n-propyl, iso-propyl, n-butyl, iso-butyl, sec-butyl, tert-butyl, n-pentyl, n-hexyl, n-heptyl, cyclohexyl, etc.; alkenyl groups such as vinyl, allyl, etc.; aryl groups such as phenyl, tolyl, nonylphenyl, etc.; aralkyl groups such as benzyl, phenetyl, etc.; and the like.

$R^2$ is an alkylene group having 2 to 3 carbon atoms. Specific examples of the alkylene group are ethylene, propylene and trimethylene.

$R^3$ is an aliphatic hydrocarbon group having 1 to 7 carbon atoms, an aryl group or an aralkyl group. Specific examples of these groups are also those described above concerning the groups represented by $R^1$.

The terminal-etherified polyalkylene glycol (B) is selected, for example, from polyethylene glycol allyl ether, polyethylene glycol dimethyl ether, polyethylene glycol diallyl ether, polyethylene glycol diethyl ether, polyethylene glycol nonylphenylbenzyl ether, polyethylene glycol propyl ether, polyethylene glycol methyl ether, polyethylene propylene glycol methyl ether, etc.

The polyhydric alcohol fatty acid ester (C) used in the present invention is a compound having at least one ester group and being derived from a polyhydric alcohol having 2 to 10 carbon atoms and a higher fatty acid having 22 to 32 carbon atoms. The polyhydric alcohol is properly selected, for example, from glycerin, pentaerythritol, sorbitan, ethylene glycol, diethylene glycol, trimethylolmethane, triethylolmethane, etc. The higher fatty acid is properly selected, for example, from behenic acid, cerotic acid, montanic acid, lacceric acid, etc.

The amount of the terminal-etherified polyalkylene glycol (B) for use per 100 parts by weight of the acetal resin (A) is 0.01 to 5 parts by weight, preferably 0.02 to 3 parts by weight.

The amount of the polyhydric alcohol fatty acid ester (C) for use per 100 parts by weight of the acetal resin (A) is 0.01 to 2 parts by weight, preferably 0.011 to 1 by weight.

It is more preferred to use the terminal-etherified polyalkylene glycol (B) and the polyhydric alcohol fatty acid ester (C) in such an amount that the total amount of these components (B) and (C) is in the range of 0.02 to 3.5 parts by weight per 100 parts by weight of the acetal resin (A). When the above total amount is less than 0.01 part by weight, little effect is practically gained. When this total amount exceeds 5 parts by weight, adverse effects are liable to be produced on the thermal stability of the acetal resin and the resultant molded article appearance.

The acetal resin composition of the present invention may further contain a known thermal stabilizer, antioxidant and ultraviolet light absorber. A conventionally known pigment, filler and additive may be also incorporated as far as the effect of the present invention is not sacrificed.

The acetal resin composition can be produced by a variety of methods, in which it is necessary to admix or melt-knead the components.

The melt-kneading apparatus is selected from various ordinary kneading machines such as an extruder, a kneader, a Banbury mixer, a mixing roll, etc. The melt-kneading can be carried out by a variety of methods, in which the above components are dry-blended with a moderate mixing apparatus such as a V-blender or a high-speed fluidization blending apparatus such as a Henschel mixer; the above components are mixed by stirring in the state of a solution, an emulsion, a suspension, etc., dried and then charged into one of the above kneading apparatus; or the terminal-etherified polyalkylene glycol and the polyhydric alcohol fatty acid ester are added to the acetal resin composition which has been homogeneously melted in one of the above kneading apparatus.

The temperature for the above melt-kneading is properly determined depending upon objects as well as various conditions such as kind of the acetal resin used, operability of the kneading apparatus, etc. in the range from the melting point of the acetal resin to the decomposition temperature thereof. In general, it is properly set in the range between 175° C. and 230° C.

The acetal resin composition of the present invention improves the mold releasability to a high degree when injection-molded without any impairment of the mechanical properties and thermal stability which are inherent to acetal resins and with substantial retention of appearance of the resultant molded article, and precision molded articles having very little strain can be produced by use of the acetal resin composition of the present invention.

The present invention is further illustrated below by reference to Examples and Comparative Examples, in which values for various performances were measured by the following methods.

Intrinsic viscosity [$\eta$]

Measured at 60° C. in p-chlorophenol containing 2% by weight of $\alpha$-pinene.

Charging amount phr

Stands for "part by weight" per 100 parts by weight of an acetal resin.

Mold releasability

Molding test conditions:
Injection molding machine: Toshiba IS-90B
Injection pressure: 800 kg/cm$^2$
Mold temperature: 60° C.
Form of molded article sample:
Bottom-closed cylinder having a height of 27 mm, an outer diameter of 34 mm and a thickness of 2 mm.
Measurement of mold releasability:
A molded test article obtained by injection-molding with an injection molding machine (IS-90B, manufactured by Toshiba Corp.) was released from a mold by ejecting it from a mold with an ejector pin. The resistance at this time was measured with a sensor (manfactured by Technoplus Inc.) connected to the ejector pin positioned in the cylinder bottom center of the molded article.

Distortion

Two types of molded articles (test sample 1 and test sample 2) were prepared and measured.

TEST SAMPLE (1)

Figures 2, 3:
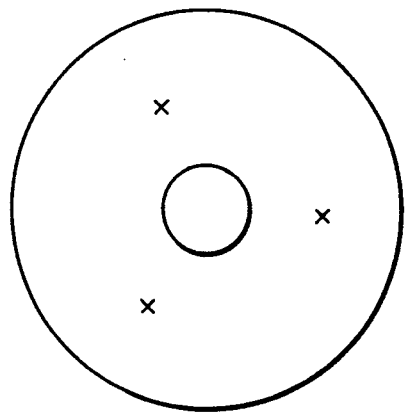

Molded articles shown in FIG. 1-1 and FIG. 1-2 (disk-shaped test sample having a diameter of 40 mm, a peripheral thickness of 5 mm and a central hole diameter of 3 mm) were prepared under the following molding conditions and under the following two different cooling conditions (1) and (2).
Molding machine: Toshiba IS-90B.
Cylinder temperature: about 200° C.
Mold temperature: about 60° C.
Injection pressure: 550 kg/cm$^2$.
Boost time: 8 seconds.
Cooling conditions:
Condition (1) 7 seconds
Condition (2) 14 seconds.
Measurement method:
The resultant test sample (1), i.e. 1 in FIG. 2 was measured for a distortion in a manner as shown in FIG. 2. That is, a cylindrical tool 2 having an outer diameter fitting an inner diameter of the central hole of the test sample 1 and a length of about 40 mm was inserted in the central hole, and while the test sample 1 and the cylindrical tool 2 were slowly rotated at 360°, values were read which were indicated on a digital micrometer 3 (Magnescale, manufactured by Sony Co., Ltd.) put on the test sample 1 at a side surface about 1 mm inside from the circumference of the test sample 1 under a constant pressure. The difference between the maximum and the minimum of the indicated values was taken as a "distortion".

TEST SAMPLE (2)

Figure 4:
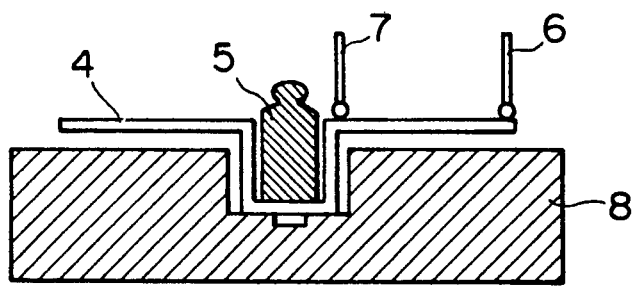
FIG. 4 is a schematic view of an apparatus for the measurement of a distortion of the above molded article test piece (2).

Molded articles shown in FIG. 3-1 and FIG. 3-2 (disk-shaped test sample having a disk diameter of 90 mm, a disk portion thickness of 1.5 mm, a cylindrical portion outer diameter of 25 mm and a cylindrical portion depth of 13 mm) were prepared under the following molding conditions for the following two different boost time conditions (1) and (2).
Molding machine: Toshiba IS-90B.
Cylinder temperature: about 200° C.
Mold temperature: about 60° C.
Injection pressure: 670 kg/cm$^2$.
Boost time:
Condition (1) 5 seconds
Condition (2) 11 seconds.
Cooling time: 10 seconds.
Measurement method:
The resultant test sample (2), i.e. 4 in FIG. 4 was measured for a distortion in a manner as shown in FIG. 4. That is, the test sample 4 was fixed on a fixation bed 8 with a weight 5, and a low-pressure probe 6 (load of 0.30) of a three-dimensionally measuring device (AE-112, manufactured by Sanpo Seisakusho) was touched on the test sample 4 along the circumference in 12 points (360°) which were located 1.5 mm inside from the circumference every 30°. Further, each of differences in the vertical direction between such 12 points and the reference points provided 32.5 mm inside from the circumference of the test sample 4 was read. A "distortion" was determined by the following expression.

Distortion = the maximum difference − the minimum difference

Thermal stability

Apparatus: DT-30, manufactured by Shimadzu Corporation.
Test: Thermal decomposition rate at 222° C. (air atmosphere).

Tensile strength

Measured according to ASTM D638.

EXAMPLES 1–12

An oxymethylene copolymer containing 2.5% by weight of a copolymer unit derived from ethylene oxide (acetal resin, [$\eta$=1.1 dl/g]) was mixed with 0.2 phr of melamine which was a thermal oxidation stabilizer, 0.5 phr of triethylene glycol-bis-[3-(3-t-butyl-4-hydroxy-5-methylphenyl)propionate] and 0.1 phr of magnesium hydroxide. Further, with the mixture were mixed a terminal-etherified polyalkylene glycol and a polyhydric alcohol fatty acid ester of which the names and amounts are shown in Table 1.

The resultant mixture composed mainly of the acetal resin was subjected to a thermal stabilization treatment with a twin-screw extruder having L/D of 30 mm, a screw diameter of 30 mm and a vent (PCM-30, manufactured by Ikegai Iron Works, Ltd) to give an acetal resin composition.

The above acetal resin composition was measured for thermal stability and mold releasability in injection molding, and further injection-molded into test samples as described in Test Samples (1) and (2). The test samples were measured for a tensile strength and a distortion. Table 2 shows the results.

EXAMPLES 13 AND 14

Example 1 was repeated except that the acetal resin was replaced with an oxymethylene homopolymer [$\eta=1.3$ dl/g] in which the terminal hydroxyl group was acetylated with acetic acid anhydride and that there were used a terminal-etherified polyalkylene glycol and a polyhydric alcohol fatty acid ester of which the names and amounts are shown in Table 1. Table 2 shows the results.

TABLE 1-continued

| | Terminal-etherified polyalkylene glycol (molecular weight) | Amount phr | Polyhydric alcohol fatty acid ester | Amount phr |
|---|---|---|---|---|
| Example 13 | Polyethylene glycol dimethyl ether (1,500) | 0.2 | Behenic acid monoglyceride | 0.12 |
| Example 14 | Polyethylene propylene glycol dimethyl ether (5,000) | 0.3 | Behenic acid monoglyceride | 0.15 |

TABLE 2

| | Mold releasability (kg/cm$^2$) | Distortion ($\mu$m) | | | | Thermal stability (%/min) | Tensile strength (kg/cm$^2$) |
|---|---|---|---|---|---|---|---|
| | | Test sample (1) | | Test sample (2) | | | |
| | | Condition (1) | Condition (2) | Condition (1) | Condition (2) | | |
| Example 1 | 40 | 45 | 40 | 120 | 110 | 0.05 | 605 |
| Example 2 | 45 | 54 | 52 | 140 | 130 | 0.04 | 630 |
| Example 3 | 45 | 53 | 51 | 135 | 129 | 0.04 | 625 |
| Example 4 | 45 | 45 | 50 | 129 | 131 | 0.04 | 625 |
| Example 5 | 50 | 54 | 57 | 144 | 131 | 0.04 | 630 |
| Example 6 | 45 | 52 | 44 | 132 | 115 | 0.04 | 625 |
| Example 7 | 60 | 80 | 82 | 165 | 158 | 0.04 | 630 |
| Example 8 | 45 | 56 | 53 | 142 | 129 | 0.04 | 630 |
| Example 9 | 45 | 54 | 51 | 144 | 140 | 0.04 | 630 |
| Example 10 | 45 | 51 | 48 | 135 | 134 | 0.04 | 630 |
| Example 11 | 45 | 47 | 44 | 128 | 120 | 0.04 | 625 |
| Example 12 | 45 | 56 | 54 | 141 | 143 | 0.04 | 630 |
| Example 13 | 45 | 67 | 59 | 158 | 155 | 0.09 | 700 |
| Example 14 | 45 | 61 | 52 | 147 | 144 | 0.09 | 700 |

TABLE 1

| | Terminal-etherified polyalkylene glycol (molecular weight) | Amount phr | Polyhydric alcohol fatty acid ester | Amount phr |
|---|---|---|---|---|
| Example 1 | Polyethylene glycol ethyl ether (10,000) | 2.0 | Behenic acid monoglyceride | 0.12 |
| Example 2 | Polyethylene glycol dimethyl ether (1,500) | 0.2 | Behenic acid monoglyceride | 0.12 |
| Example 3 | Polyethylene glycol diallyl ether (2,000) | 0.2 | Behenic acid monoglyceride | 0.12 |
| Example 4 | Polyethylene glycol nonyl-phenylbenzyl ether (2,500) | 0.2 | Behenic acid monoglyceride | 0.12 |
| Example 5 | Polypropylene glycol dimethyl ether (2,000) | 0.1 | Behenic acid monoglyceride | 0.10 |
| Example 6 | Polyethylene propylene glycol dimethyl ether (5,000) | 0.3 | Behenic acid monoglyceride | 0.15 |
| Example 7 | Polyethylene glycol diethyl ether (5,000) | 0.03 | Behenic acid monoglyceride | 0.015 |
| Example 8 | Polyethylene glycol dimethyl ether (1,500) | 0.2 | Sorbitan monobehenate | 0.12 |
| Example 9 | Polyethylene glycol dimethyl ether (1,500) | 0.2 | Cerotic acid monoglyceride | 0.12 |
| Example 10 | Polyethylene glycol propyl ether (5,000) | 0.3 | Lacceric acid monoglyceride | 0.12 |
| Example 11 | Polyethylene glycol butyl ether (5,000) | 0.5 | Montanic acid monoglyceride | 0.12 |
| Example 12 | Polyethylene glycol dipropyl ether (5,000) | 0.2 | Sorbitan erucic acid mono-ester | 0.12 |

COMPARATIVE EXAMPLES 1-9

Example 1 was repeated except that neither (1) a terminal-etherified polyalkylene glycol of the general formula $R_1$—O—($R_2$—O—)$_m$—$R_3$ nor (2) a polyhydric alcohol fatty acid ester derived from a polyhydric alcohol having 2 to 10 carbon atoms and a higher fatty acid having 22 to 32 carbon atoms was used (Comparative Example 1), or except that only one of these compounds (1) and (2) was used (Comparative Examples 2 and 3). Table 4 shows the results. Further, Example 1 was repeated by using compound(s) other than the above compounds (1) and (2), shown in Table 3 (Comparative Examples 4 to 9). Table 4 shows the results.

COMPARATIVE EXAMPLE 10

Example 1 was repeated except that the acetal resin was replaced with the same oxymethylene homopolymer as that used in Examples 13 and 14 and that compounds other than the same thermal oxidation stabilizer as that used in Example 1 were not used. Table 4 shows the results.

TABLE 3

| | Terminal-etherified polyalkylene glycol or other compound (molecular weight) | Amount phr | Polyhydric alcohol fatty acid ester or other compound (molecular weight) | Amount phr |
|---|---|---|---|---|
| Comparative Example 1 | — | — | — | — |
| Comparative Example 2 | Polyethylene glycol ethyl ether (10,000) | 2.2 | — | — |
| Comparative Example 3 | — | — | Behenic acid monoglyceride | 2.0 |

TABLE 3-continued

| | Terminal-etherified polyalkylene glycol or other compound (molecular weight) | Amount phr | Polyhydric alcohol fatty acid ester or other compound (molecular weight) | Amount phr |
|---|---|---|---|---|
| Comparative Example 4 | Polyethylene glycol lauryl ether (5,000) | 0.2 | Polyglycerin distearate (4,000) | 0.3 |
| Comparative Example 5 | Polyethylene glycol (20,000) | 0.2 | — | — |
| Comparative Example 6 | Glycerin | 0.3 | — | — |
| Comparative Example 7 | Polypropylene glycol (1,000) | 0.3 | — | — |
| Comparative Example 8 | Ethylene bisstearamide | 0.2 | Behenic acid monoglyceride | 0.12 |
| Comparative Example 9 | Calcium 12-hydroxystearate | 0.2 | Sorbitan monobehenate | 0.12 |
| Comparative Example 10 | — | — | — | — |

TABLE 4

| | Mold releasability (kg/cm²) | Distortion (μm) | | | | Thermal stability (%/min) | Tensile strength (kg/cm²) |
|---|---|---|---|---|---|---|---|
| | | Test sample (1) | | Test sample (2) | | | |
| | | Condition (1) | Condition (2) | Condition (1) | Condition (2) | | |
| Comparative Example 1 | 150 | 120 | 131 | 210 | 212 | 0.04 | 630 |
| Comparative Example 2 | 120 | 92 | 95 | 178 | 169 | 0.05 | 605 |
| Comparative Example 3 | 50 | 90 | 89 | 175 | 161 | 0.05 | 600 |
| Comparative Example 4 | 115 | 97 | 100 | 185 | 179 | 0.06 | 620 |
| Comparative Example 5 | 135 | 111 | 114 | 193 | 198 | 0.04 | 615 |
| Comparative Example 6 | 120 | 104 | 106 | 190 | 189 | 0.06 | 590 |
| Comparative Example 7 | 130 | 103 | 100 | 180 | 199 | 0.04 | 620 |
| Comparative Example 8 | 40 | 90 | 84 | 174 | 170 | 0.04 | 630 |
| Comparative Example 9 | 55 | 91 | 88 | 176 | 174 | 0.05 | 630 |
| Comparative Example 10 | 155 | 130 | 136 | 221 | 224 | 0.09 | 705 |

What is claimed is:

1. An acetal resin composition comprising:
   (A) 100 parts by weight of an acetal resin,
   (B) 0.01 to 5 parts by weight of a terminal-etherified polyalkylene glycol of the formula (I)

$$R^1-O-(-R^2-O-)_m-R^3$$

wherein $R^1$ is a hydrogen atom, an aliphatic hydrocarbon group having 1 to 7 carbon atoms, an aryl group or an aralkyl group, $R^2$ is an alkylene group having 2 to 3 carbon atoms, $R^3$ is an aliphatic hydrocarbon group having 1 to 7 carbon atoms, an aryl group or an aralkyl group, and m is a number of at least 20,
   and
   (C) 0.01 to 2 parts by weight of an ester from a polyhydric alcohol having 2 to 10 carbon atoms and a higher fatty acid having 22 to 32 carbon atoms.

2. The composition of claim 1, wherein the acetal resin (A) is a homopolymer of formaldehyde or a cyclic oligomer thereof or a copolymer of either formaldehyde or a cyclic oligomer thereof and a cyclic ether.

3. The composition of claim 1, wherein the terminal-etherified polyalkylene glycol (B) is contained in an amount of 0.02 to 3 parts by weight.

4. The composition of claim 1, wherein the ester (C) from a polyhydric alcohol having 2 to 10 carbon atoms and a higher fatty acid having 22 to 32 carbon atoms is contained in an amount of 0.011 to 1 part by weight.

5. The composition of claim 1, wherein the terminal-etherified polyalkylene glycol (B) and the ester (C) from a polyhydric alcohol having 2 to 10 carbon atoms and a higher fatty acid having 22 to 32 carbon atoms are contained in a total amount of 0.02 to 3.5 parts by weight.

* * * * *